US011768311B2

(12) United States Patent
Sobolewski et al.

(10) Patent No.: US 11,768,311 B2
(45) Date of Patent: Sep. 26, 2023

(54) EFFICIENT TRANSMITTER FOR NUCLEAR MAGNETIC RESONANCE LOGGING WHILE DRILLING

(71) Applicant: Halliburton Energy Services, Inc., Houston, TX (US)

(72) Inventors: Zbigniew Sobolewski, Houston, TX (US); Arcady Reiderman, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 110 days.

(21) Appl. No.: 17/520,270

(22) Filed: Nov. 5, 2021

(65) Prior Publication Data
US 2023/0145921 A1 May 11, 2023

(51) Int. Cl.
*G01V 3/32* (2006.01)
*E21B 47/12* (2012.01)
*E21B 17/02* (2006.01)

(52) U.S. Cl.
CPC ............ *G01V 3/32* (2013.01); *E21B 17/0283* (2020.05); *E21B 47/12* (2013.01)

(58) Field of Classification Search
CPC ... G01V 3/32; G01V 3/18; G01V 3/14; G01V 2200/16; G01N 24/08; G01N 24/081;
(Continued)

(56) References Cited

U.S. PATENT DOCUMENTS 5,057,776 A * 10/1991 Macovski ............ G01R 33/445
324/309
5,804,976 A * 9/1998 Gaskin ................. G01N 27/223
324/645

(Continued)

OTHER PUBLICATIONS

MRIL-WD™ Magnetic Resonance Imaging Logging While Drilling Sensor, Bound fluid, free fluid and total porosity in real time while drilling, accessed Dec. 14, 2021.
(Continued)

*Primary Examiner* — Daniel R Miller
*Assistant Examiner* — Eric Sebastian Von Wald
(74) *Attorney, Agent, or Firm* — Benjamin Ford; C. Tumey Law Group PLLC

(57) ABSTRACT

A nuclear magnetic resonance (NMR) downhole tool and method that may include a housing, a power source, a Radio Frequency (RF) pulse generator tank electrically connected to the power source, a power switch electrically disposed within the RF pulse generator tank and disposed in the housing, and an NMR signal acquisition tank electrically connected to the RF pulse generator tank and disposed in the housing. The method may include disposing the NMR downhole tool into a wellbore, charging a first capacitor with the power source that is electrically connected to the first capacitor, generating a RF pulse, disconnecting the first capacitor from the RF pulse generator tank, and storing energy from the inductive coil in the first capacitor. The method may further include connecting the inductive coil to an NMR signal acquisition tank using a decoupler switch and acquiring an NMR signal with the NMR signal acquisition tank.

15 Claims, 6 Drawing Sheets

(58) Field of Classification Search
CPC .... G01N 24/12; G01N 24/00; G01R 33/3607; G01R 33/4616; E21B 17/0283; E21B 17/028; E21B 47/12; E21B 47/00; E21B 47/16

See application file for complete search history.

(56) References Cited

U.S. PATENT DOCUMENTS

| | | | |
|---|---|---|---|
| 6,603,309 | B2 | 8/2003 | Forgang et al. |
| 7,075,298 | B2 * | 7/2006 | Mityushin ................ G01V 3/32 324/303 |
| 9,766,192 | B2 | 9/2017 | Derby |
| 9,851,420 | B2 | 12/2017 | Song |
| 10,908,239 | B1 * | 2/2021 | Zens .................. G01R 33/3628 |
| 2004/0119471 | A1 * | 6/2004 | Blanz ..................... G01R 33/62 324/303 |
| 2015/0115954 | A1 | 4/2015 | Song et al. |
| 2016/0033670 | A1 | 2/2016 | Reiderman et al. |
| 2016/0230534 | A1 | 8/2016 | Sobolewski et al. |
| 2017/0010378 | A1 | 1/2017 | Reiderman et al. |
| 2017/0044892 | A1 | 2/2017 | Sobolewski et al. |
| 2017/0176360 | A1 | 6/2017 | Reiderman et al. |
| 2018/0017698 | A1 | 1/2018 | Shin et al. |
| 2018/0217289 | A1 | 8/2018 | Li et al. |
| 2018/0267197 | A1 | 9/2018 | Li et al. |
| 2018/0348319 | A1 | 12/2018 | Li et al. |
| 2018/0356552 | A1 | 12/2018 | Li et al. |
| 2019/0049617 | A1 * | 2/2019 | Kadayam Viswanathan ............... G01R 33/4641 |
| 2019/0056524 | A1 | 2/2019 | Reiderman |
| 2019/0285767 | A1 | 9/2019 | Li et al. |
| 2020/0241092 | A1 | 7/2020 | Jachmann et al. |
| 2021/0123340 | A1 | 4/2021 | Reiderman |
| 2021/0208301 | A1 | 7/2021 | Reiderman |
| 2021/0286100 | A1 | 9/2021 | Chen et al. |

OTHER PUBLICATIONS

MRIL®-WD™ Magnetic Resonance Imaging Logging-While-Drilling Sensor, Source-Less Porosity Delivers Assessment of Reservoir Quality, accessed Dec. 14, 2021.
Operator Uses Real-Time Magnetic Resonance to Assess Rock Quality in Clastic Formations, accessed Dec. 14, 2021.
Provision-plus-lwd—Schlumberger—Accessed Nov. 5, 2021.
MagTrak LWD magnetic resonance service—Baker Hughes—Accessed Nov. 5, 2021.

* cited by examiner

EFFICIENT TRANSMITTER FOR NUCLEAR MAGNETIC RESONANCE LOGGING WHILE DRILLING

BACKGROUND

During hydrocarbon exploration and production, nuclear magnetic resonance (NMR) may be utilized to acquire data from a downhole environment. NMR logging measures an induced magnet moment of hydrogen nuclei (protons) contained within fluid-filled pore space of porous media such as reservoir rocks. Unlike conventional logging measurements (e.g., acoustic, density, neutron, and resistivity), which are dependent on mineralogy and respond to a rock matrix and fluid properties, NMR-logging measurements respond to a presence of hydrogen in pore fluids, such as water and hydrocarbons, for example. NMR effectively responds to a volume, a composition, a viscosity, and a distribution of the pore fluids. NMR logs provide information about the quantities of fluids present, the properties of these fluids, and sizes of the pores containing these fluids.

Downhole NMR sensors have a relatively small radial extent of the sensitivity area making NMR well logging tool data sensitive to lateral (radial) motion, especially when making T2-measurements while drilling. To reduce sensitivity of LWD NMR tool to lateral motion when conducting T2 measurements while drilling, a short RF pulse is needed to increase the radial extent of the sensitive volume. To reduce this sensitivity, a short and high-power excitation RF pulse may be used to increases the radial extent of the sensitive area. Standard implementations for generating RF pulses may result in insufficient efficiency. For example, the generation efficiency suffers due to energy losses associated with charging a tank capacitor and then dumping stored energy in the tank into a critical resistor when ending the pulse.

BRIEF DESCRIPTION OF THE DRAWINGS

These drawings illustrate certain aspects of some examples of the present disclosure and should not be used to limit or define the disclosure.

DETAILED DESCRIPTION

This disclosure details a method and system to improve the efficiency of generating RF pulses. Generally, proposed are methods and systems for improving the efficiency while generating RF pulses. Improving efficiency may be achieved by implementing rather than damping energy stored in the antenna at the end of the RF pulse. The disclosure discussed below relates to the energy stored in a capacitor within an NMR antenna circuit and disconnecting it from the antenna to use it to generate the next pulse(s). For a low frequency short RF pulse, in practical implementation, the proposed pulse generation scheme may save power.

Figure 1:
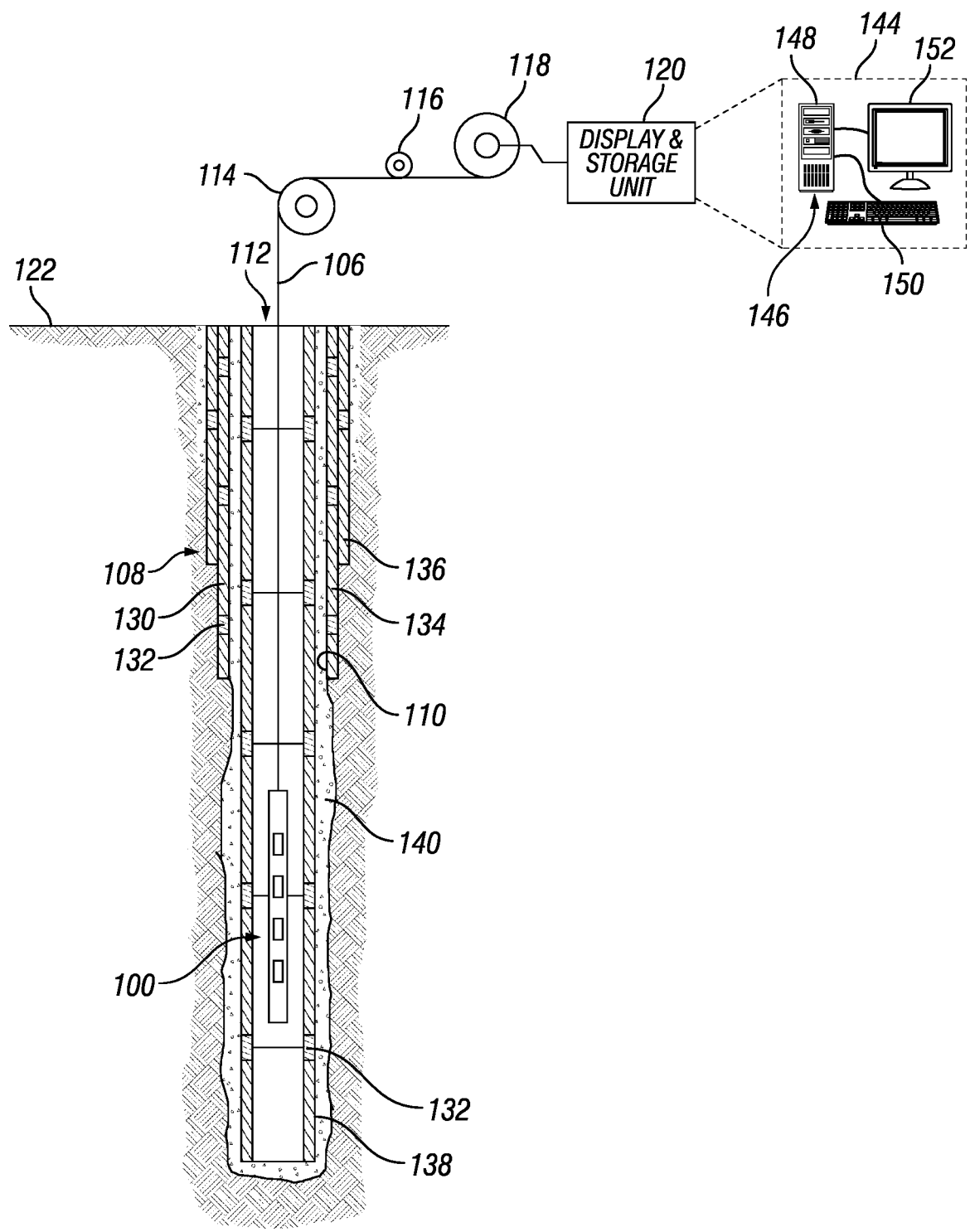
FIG. 1 illustrates an NMR tool in a wireline configuration, in accordance with examples of the present disclosure.

FIG. 1 illustrates an operating environment for an NMR tool 100, in accordance with examples of the present disclosure. It should be noted that while FIG. 1 generally depicts a land-based operation, those skilled in the art may recognize that the principles described herein are equally applicable to subsea operations that employ floating or sea-based platforms and rigs, without departing from the scope of the disclosure.

As illustrated, NMR tool 100 may be operatively coupled to a conveyance 106 (e.g., wireline, slickline, coiled tubing, pipe, downhole tractor, and/or the like) which may provide mechanical suspension, as well as electrical connectivity, for NMR tool 100. It should be understood that the configuration of NMR tool 100 shown on FIG. 1 is merely illustrative and other configurations of NMR tool 100 may be used with the present techniques.

A conveyance 106 and NMR tool 100 may extend within a casing string 108 to a desired depth within wellbore 110. Conveyance 106, which may comprise one or more electrical conductors, may exit a wellhead 112, may pass around a pulley 114, may engage an odometer 116, and may be reeled onto a winch 118, which may be employed to raise and lower NMR tool 100 in wellbore 110. Signals recorded by NMR tool 100 may be stored on memory and then processed by a display and storage unit 120 after recovery of NMR tool 100 from wellbore 110. Alternatively, signals recorded by NMR tool 100 may be transmitted to display and storage unit 120 by way of conveyance 106. The display and storage unit 120 may process the signals, and the information contained therein may be displayed for an operator to observe and store for future processing and reference. Alternatively, the signals may be processed downhole prior to receipt by display and storage unit 120 or both downhole and at a surface 122, for example. Display and storage unit 120 may also contain an apparatus for supplying control signals and power to NMR tool 100. Casing string 108 may extend from Wellhead 112 at or above ground level to a selected depth within wellbore 110. Casing string 108 may comprise a plurality of joints 130 or segments of casing string 108, each joint 130 being connected to the adjacent segments by a collar 132. There may be any number of layers in casing string 108. For example, the layers may comprise a first casing 134 and a second casing 136.

FIG. 1 also illustrates a pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. NMR tool 100 may be dimensioned so that it may be lowered into wellbore 110 through pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between first casing 134 and second casing 136.

In logging systems utilizing NMR tool 100, a digital telemetry system may be employed, wherein an electrical circuit may be used to both supply power to NMR tool 100 and to transfer data between the display and storage unit 120 and NMR tool 100. A DC voltage may be provided to NMR tool 100 by a power supply located above ground level, and data may be coupled to the DC power conductor by a baseband current pulse system. Alternatively, NMR tool 100 may be powered by batteries located within the downhole tool assembly, and/or the data provided by NMR tool 100 may be stored within the downhole tool assembly, rather than transmitted to the surface during logging.

In certain examples, operation and function of NMR tool 100 may be controlled at surface 122 by a computer or an information handling system 144. As illustrated, information handling system 144 may be a component of display and storage unit 120. Information handling system 144 may comprise any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 144 may be a personal computer, a network storage device, or any other suitable device and may vary in size, shape, performance, functionality, and price. Information handling system 144 may comprise a processing unit 146 (e.g., microprocessor, central processing unit, etc.) that may process EM log data by executing software or instructions obtained from a local non-transitory computer readable media 148 (e.g., optical disks, magnetic disks). Non-transitory computer readable media 148 may store software or instructions of the methods described herein. Non-transitory computer readable media 148 may comprise any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. At Surface 122, information handling system 144 may also comprise input device(s) 150 (e.g., keyboard, mouse, touchpad, etc.) and output device(s) 152 (e.g., monitor, printer, etc.). Input device(s) 150 and output device(s) 152 provide a user interface that enables an operator to interact with NMR tool 100 and/or software executed by processing unit 146. For example, information handling system 144 may enable an operator to select analysis options, view collected log data, view analysis results, and/or perform other tasks. In examples, NMR tool 100 and information handling system 144 may be utilized to measure properties (e.g., NMR properties) in a downhole environment.

Figure 2:
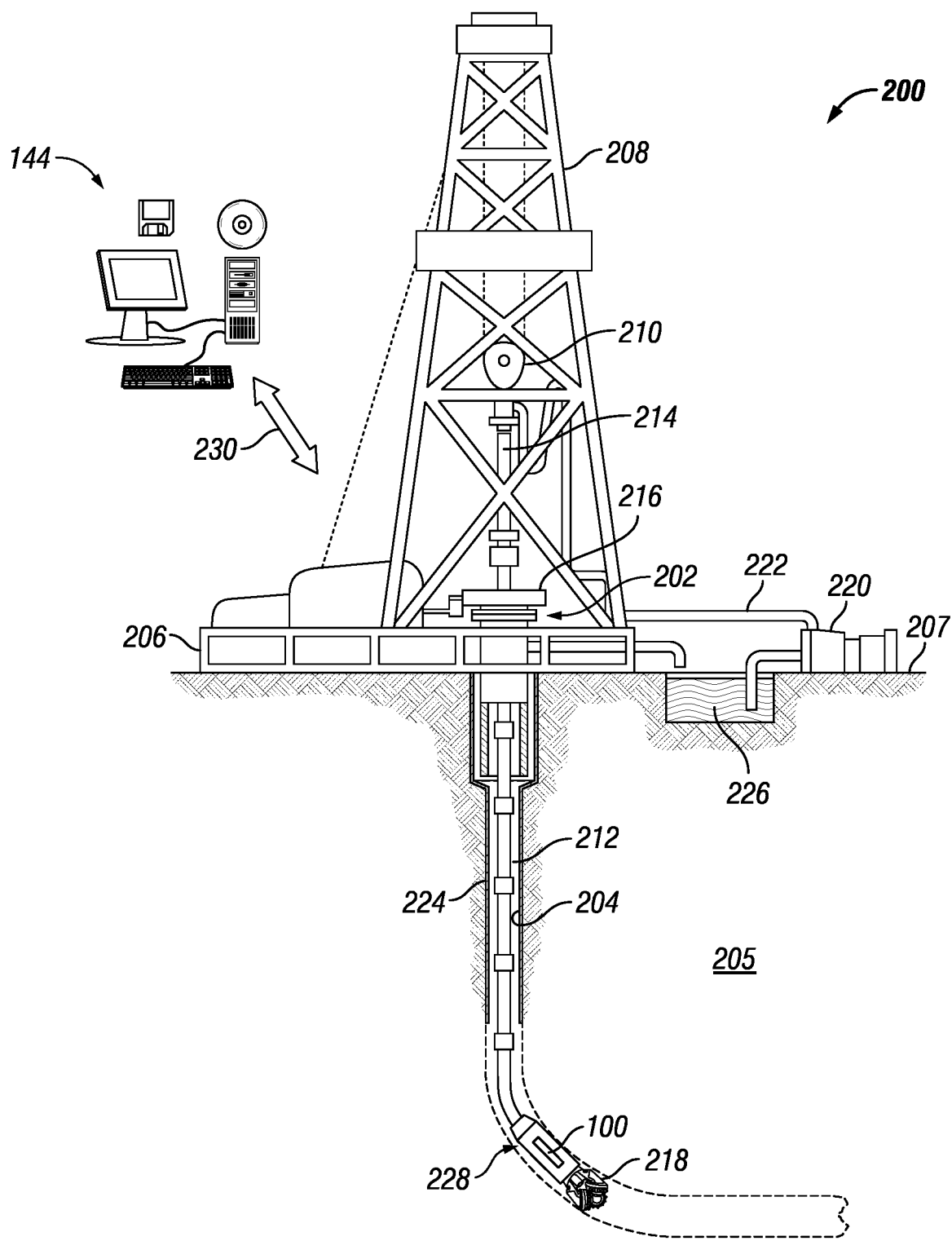
FIG. 2 illustrates an NMR tool in a drilling configuration, in accordance with examples of the present disclosure.

FIG. 2 illustrates an example of NMR tool 100 included in a drilling system 200, in accordance with examples of the present disclosure. It should be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a borehole 204 may extend from a wellhead 202 into a subterranean formation 205 from a surface 207. Borehole 204 may comprise horizontal, vertical, slanted, curved, and other types of borehole geometries and orientations. A drilling platform 206 may support a derrick 208 having a traveling block 210 for raising and lowering a drill string 212. Drill string 212 may include, but is not limited to, drill pipe and coiled tubing, as generally known to those skilled in the art. A top drive or kelly 214 may support drill string 212 as it may be lowered through a rotary table 216. A drill bit 218 may be attached to the distal end of drill string 212 and may be driven either by a downhole motor and/or via rotation of drill string 212 from the surface 207. Without limitation, drill bit 218 may comprise roller cone bits, PDC bits, natural diamond bits, any hole openers, reamers, coring bits, and the like. As drill bit 218 rotates, it may create and extend borehole 204 that penetrates subterranean formation 205. A pump 220 may circulate drilling fluid through a feed pipe 222 to kelly 214, downhole through the interior of drill string 212, through orifices in drill bit 218, back to surface 207 via an annulus 224 surrounding drill string 212, and into a retention pit 226.

Drill string 212 may begin at wellhead 202 and may traverse borehole 204. Drill bit 218 may be attached to a distal end of drill string 212 and may be driven, for example, either by a downhole motor and/or via rotation of drill string 212 from surface 207. Drill bit 218 may be a part of a bottom hole assembly 228 at a distal end of drill string 212. Bottom hole assembly 228 may comprise NMR tool 100 via threaded connections, for example. As will be appreciated by those of ordinary skill in the art, bottom hole assembly 228 may be a measurement-while drilling (MWD) or logging-while-drilling (LWD) system.

Without limitation, NMR tool 100 may be connected to and/or controlled by information handling system 144. Processing of information recorded may occur downhole and/or at surface 207. Data being processed downhole may be transmitted to surface 207 to be recorded, observed, and/or further analyzed. Additionally, the data may be stored in memory of NMR tool 100 while NMR tool 100 is disposed downhole.

In some examples, wireless communication may be used to transmit information back and forth between information handling system 144 and NMR tool 100. Information handling system 144 may transmit information to NMR tool 100 and may receive, as well as process information recorded by NMR tool 100. In examples, while not illustrated, bottom hole assembly 228 may comprise one or more additional components, such as an analog-to-digital converter, filter and amplifier, among others, that may be used to process the measurements of NMR tool 100 before they may be transmitted to the surface 207. Alternatively, raw measurements may be transmitted to the surface 207 from NMR tool 100.

Any suitable technique may be used for transmitting signals from NMR tool 100 to the surface 207, including, but not limited to, wired pipe telemetry, mud-pulse telemetry, acoustic telemetry, and electromagnetic telemetry. While not illustrated, bottom hole assembly 228 may comprise a telemetry subassembly that may transmit telemetry data to surface 207. Without limitation, an electromagnetic source in the telemetry subassembly may be operable to generate pressure pulses in the drilling fluid that propagate along the fluid stream to the surface 207. At the surface 207, pressure transducers (not shown) may convert the pressure signal into electrical signals for a digitizer (not illustrated). The digitizer may supply a digital form of the telemetry signals to information handling system 144 via a communication link 230, which may be a wired or wireless link. The telemetry data may be analyzed and processed by the information handling system 144.

Figure 3A:
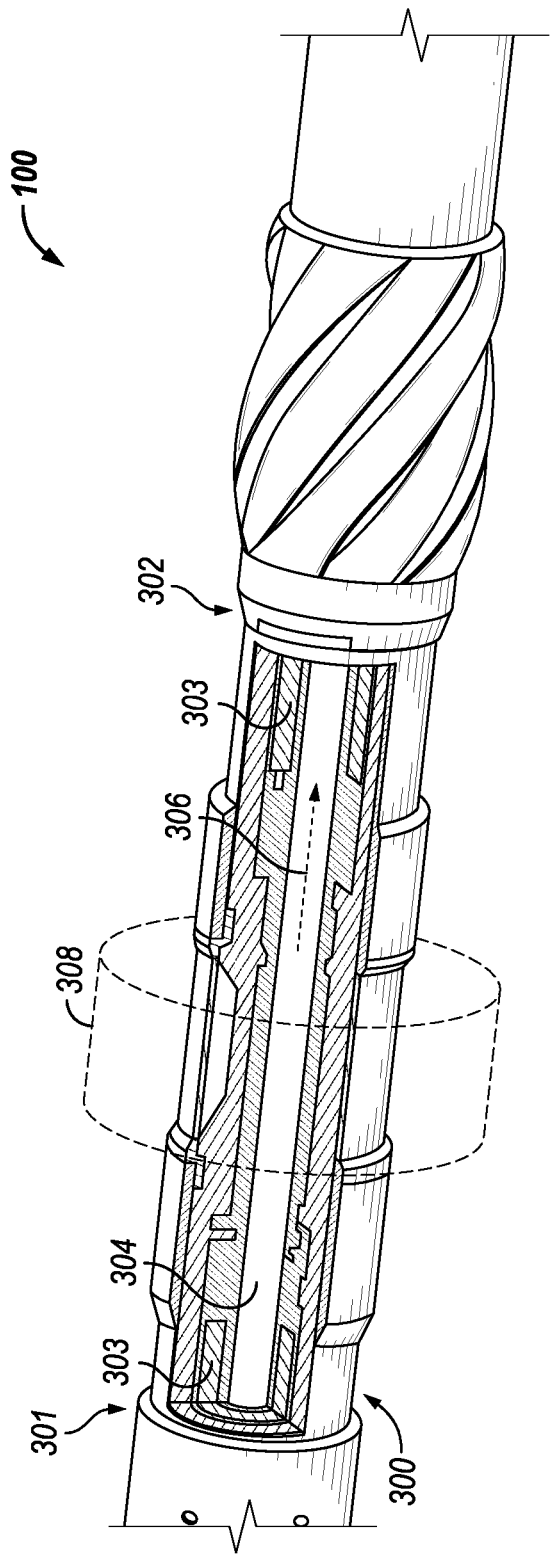
FIG. 3A illustrates a close-up cutaway perspective view of the NMR tool, in accordance with examples of the present disclosure.

FIG. 3A illustrates a cutaway close-up view of NMR tool 100 in accordance with some examples of the present disclosure. NMR tool 100 is a non-limiting example and other suitable NMR tools may be utilized, as should be understood by one having skill in the art, with the benefit of this disclosure. NMR tool 100 may comprise a housing 300 that may be of a cylindrical or tubular shape that extends longitudinally from a first end 301 to a second end 302. In certain examples, first end 301 and second end 302 may be threaded for connection to a drill string for example. Magnets 303 may be disposed within housing 300. Magnets 303 may be of a tubular shape and may comprise samarium-cobalt magnets, for example. In some examples, magnets 303 may encompass a passage 304 that extends longitudinally through housing 300. A passage 304 may receive a fluid 306 (e.g., a drilling fluid) flowing in a downhole direction, as illustrated. A magnetic field 308 is emitted from magnets 303 and surrounds or encompasses housing 300. NMR tool 100 may receive the fluid 306 at a rate ranging from 200 gallons per minute to 1000 gallons per minute, in some examples.

Figure 3B:
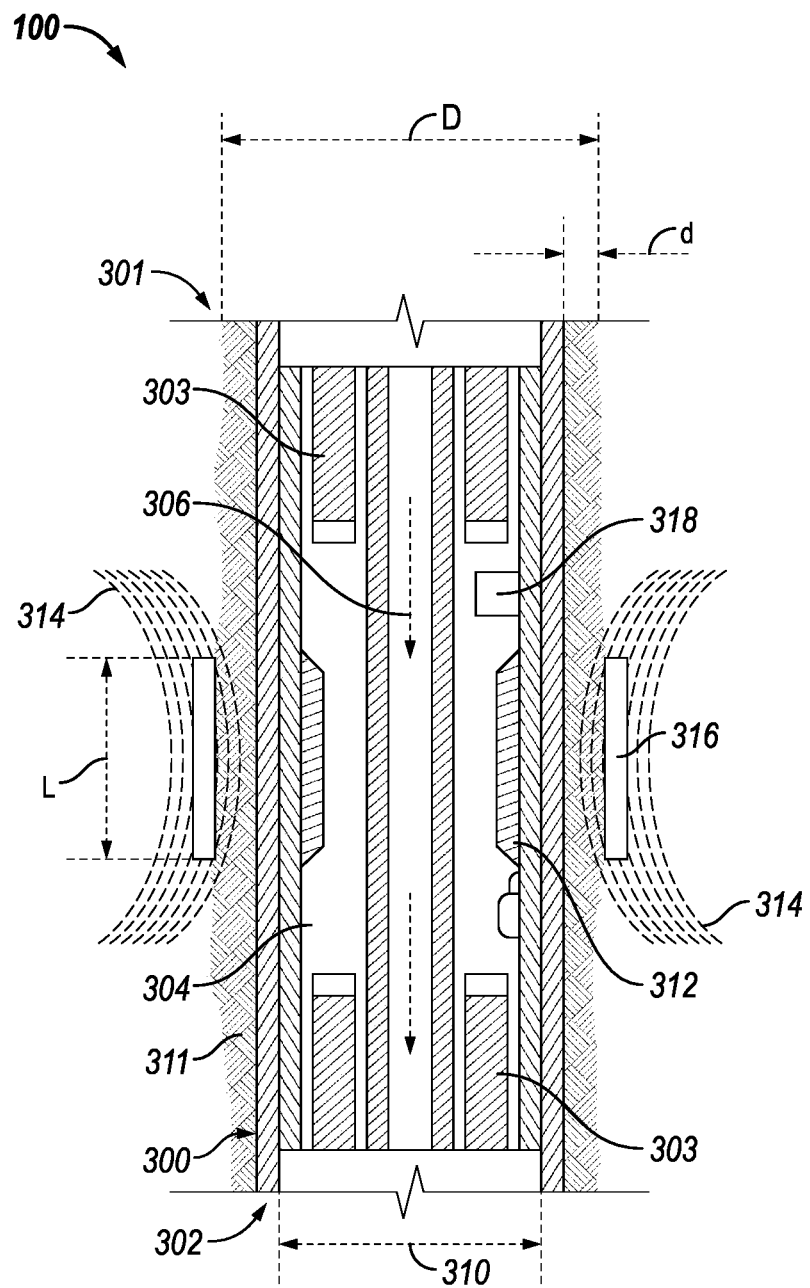
FIG. 3B illustrates an axial cross-sectional view of the NMR tool, in accordance with examples of the present disclosure.

FIG. 3B illustrates an axial cross-section of NMR tool 100, in accordance with some examples of the present disclosure. NMR tool 100 may be disposed in a wellbore 310. Passage 304 may extend through a center of NMR tool 100 and may pass the fluid 306 from first end 301 (e.g., an up-hole end) to second end 302 (e.g., a downhole end). NMR tool 100 may further comprise a coaxially coil or NMR antenna circuit 312 wound about NMR tool 100 or wound around an inner (e.g., interior of the NMR tool 100) or outer circumference (e.g., exterior of the NMR tool 100) of housing 300. A diameter of investigation, D, that extends into a subterranean formation 311, may range from 8 inches to 20 inches, for example.

A magnetic field gradient 314 decays away from NMR tool 100, as illustrated. At a selected operating frequency, NMR antenna circuit 312 transmits radio frequency (RF) signal or field Bi to the formation, NMR antenna circuit 312 and a static magnetic field Bo generated by the magnets 303 defines a sensitive volume, in the form of a resonant shell 316 that may encompass NMR tool 100. NMR antenna circuit 312 may also serve as a receiver or a separate receiving NMR antenna circuit 312 can be used to receive the NMR signal from the fluids in the sensitive volume generated by the RF signal. The resonant shell 316 may extend longitudinally and have a length, L, ranging from 2 inches (5 centimeters (cm)) to 12 inches (30 cm), for example. Alternatively, the resonant shell 316 may have a length that is less than 2 inches (5 cm) or greater than 12 inches (30 cm), in some examples. A depth, d, of investigation into the subterranean formation 311 may range from 2 inches (5 cm) to 12 inches (30 cm) in some examples. The resonant shell 316 may comprise a thickness ranging from 0.1 inches (10 millimeters (mm)) to 1 inch (25 mm), for example.

In certain examples, the resonant shell 316 is the only location in the subterranean formation 311 where measurements are taken with NMR tool 100 (e.g., via the NMR antenna circuit 312). Measurements are not made between NMR tool 100 and resonant shell 316, and from resonant shell 316 to further into the subterranean formation 311. In certain examples, NMR tool 100 may comprise a downhole computer or downhole information handling system 318 for controlling and operating NMR tool 100. Downhole information handling system 318 may be disposed within housing 300 and may comprise components that may be similar to information handling system 144 as previously described, such as, for example, a microprocessor, a memory, or other suitable circuitry, for estimating, receiving, storing, and/or processing signals or data in a downhole environment.

Figure 4:
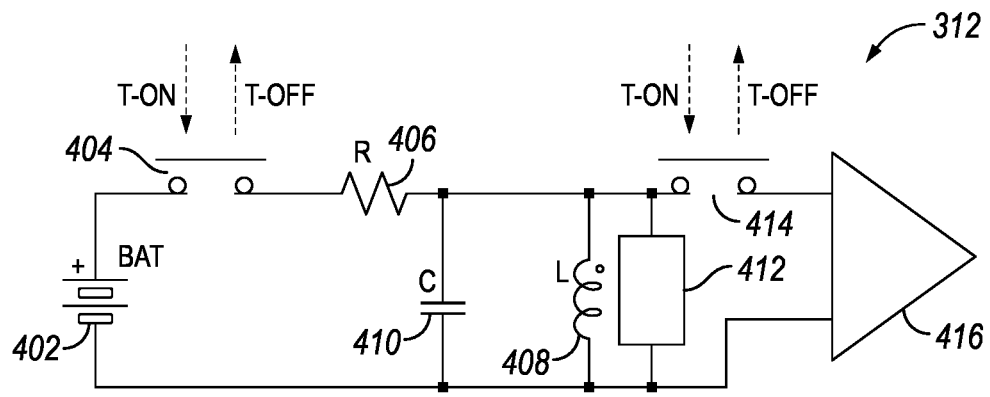
FIG. 4 illustrates an NMR antenna circuit.

FIG. 4 illustrates an electrical structure of NMR antenna circuit 312 as a transmitter and/or receiver of NMR tool 100 (e.g., referring to FIG. 1). NMR antenna circuit 312 may comprise a power source 402 such as a battery located on NMR tool 100 or an AC/DC power supply located at the surface. Additionally, NMR antenna circuit 312 may comprise an electronic switch 404, a source resistor 406, an inductive coil 408, and first capacitor 410. Inductive coil 408 represents the intrinsic inductive properties of NMR antenna circuit 312. NMR antenna circuit 312 may further comprise an energy dump 412, a decoupler switch 414 and receiver 416. Decoupler switch 414 may be a transmitter/receiver decoupling switch. Receiver 416 may comprise a low noise amplifier and other stages of receiving electronics known to one of ordinary skill in the art. Generating an RF signal for NMR antenna circuit 312 may be accomplished by alternating or pulsing power source 402 at a rate of twice per period of a desired RF signal frequency via electronic switch, thus connecting power source 402 to inductive coil 408. However, power source 402 may be pulsed at different rates in order to generate an RF signal. The beginning of the pulse charges first capacitor 410 and is associated with losses in source resistor 406. During the RF pulse, additional energy is lost through inductive coil 408. This lost energy may be measured by quality factor Q. Such energy loss may be compensated by periodically connecting inductive coil 408 to power source 402 during the pulse via electronic switch 404. To end the RF pulse, energy present in NMR antenna circuit 312 is removed using energy dump 412. During the RF signal generation decoupler switch 414 may be open so the receiver 416 is disconnected from NMR antenna circuit 312. During the NMR signal acquisition, the de-coupler switch connects receiver 416 to the rest NMR antenna circuit 312 so that an NMR signal may be acquired.

Figure 5A:
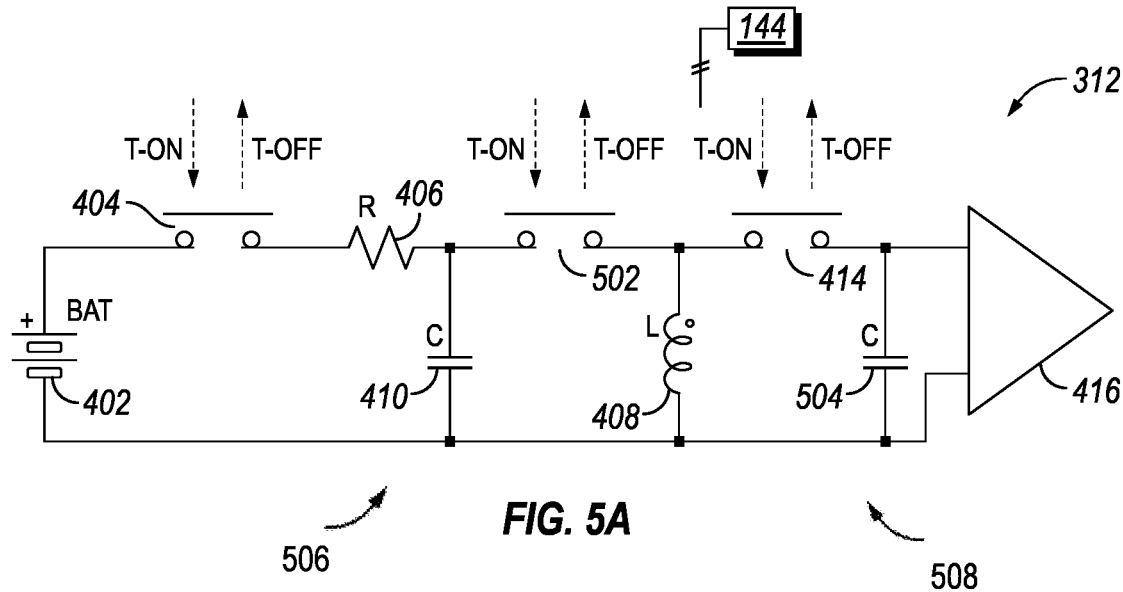
FIG. 5A illustrates an improved NMR antenna circuit.

FIG. 5A illustrates another example of NMR antenna circuit 312. Such an example of NMR antenna circuit 312 may minimizes losses associated with starting the RF pulse by initially charging capacitor 410 for every pulse of the pulse sequence and ending the RF pulse by minimizing losses in energy dump 412. As illustrated in FIG. 5A, RF pulse generator tank 506 may comprise first capacitor 410, and inductive coil 408. First capacitor 410 and inductive coil 408 may be tuned to operate at a desired operating frequency. Tuning first capacitor 410 and inductive coil may be adjustable to operate at multiple frequencies. FIG. 5A also illustrates NMR signal acquisition tank 508, which may comprise second capacitor 504, receiver 416, and inductive coil 408. Similarly, second capacitor 504 and inductive coil 408 may be adjustably tuned for a selected desired operating frequency to resonate a current at the desired operating frequency. Inductive coil 408 may be configured in both RF pulse generator tank 506 and NMR signal acquisition tank 508. Additionally, FIG. 5A illustrates power switch 502, electronic switch 404, and decoupler switch 414. Information handling system 144 may be configured to open and close electronic switch 404, power switch 502, and decoupler switch 414 via an electrically wired or wireless implementation. Information handling system 144 may switch and control NMR antenna circuit 312 during and between generating an RF pulse with RF pulse generator tank 506 and receiving an NMR signal with NMR signal acquisition tank 508.

At the beginning of RF pulse generation RF pulse generator tank 506 is engaged. Power source 402 may initially charge first capacitor 410 at the beginning of RF pulse generation and/or during NMR signal acquisition. During RF pulse generation, energy stored in first capacitor and power source 402 may resonate and energize inductive coil 408 to produce an RF pulse with an RF current in the inductive coil 408 at desired operating frequency. To end the RF pulse generation, first capacitor 410 may be disconnected from inductive coil 408. Thus, current in RF pulse generator tank 506, when oscillating current in inductive coil 408 is substantially zero as all the energy of RF pulse generator tank 506 is stored in first capacitor 410. Stored energy may be reused in subsequent RF pulse generation. As an effect, no energy is transferred to energy dump 412 (e.g., referring to FIG. 4) and no energy losses associated with the dump are present in NMR antenna circuit 312 of FIG. 5A.

Subsequent to RF pulse generation, NMR antenna tank 508 may be used to receive an NMR signal. This may be accomplished by opening power switch 502 and closing decoupler switch 414 to disconnect first capacitor 410 and connect second capacitor 504 to NMR antenna 312. The capacitance of second capacitor 504 may be substantially the same as first capacitor 410. Alternatively, the capacitance of first capacitor 410 and second capacitor 504 may be slightly different to account for different parasitic capacitance of the receiver and transmitter circuits.

Figure 5B:
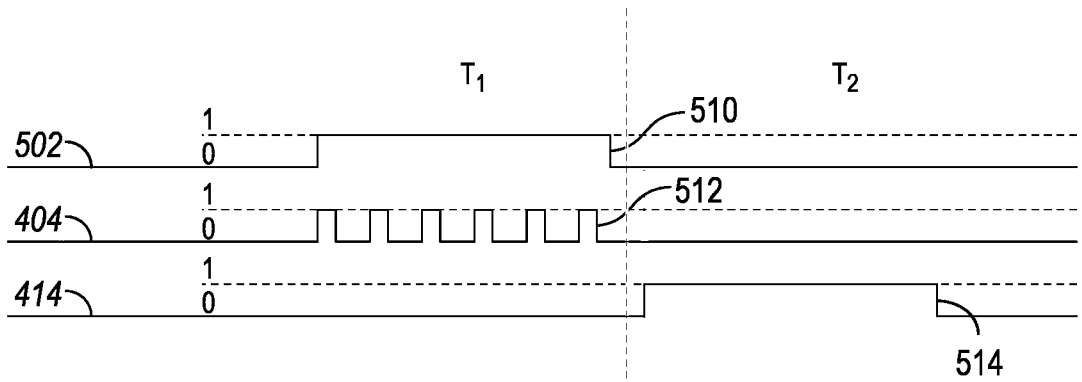
FIG. 5B illustrates a time diagram for switches from previous NMR antenna circuit.

FIG. 5B shows time diagram 510, 512, and 514 for electronic switch 404, power switch 502, and decoupler switch 414 respectively. $T_1$ represents operation of the NMR antenna circuit 312 during RF pulse generation while $T_2$ represents operation of the circuit of NMR antenna circuit 312 during NMR signal acquisition. Each time diagram 510, 512, and 514 provides whether switch 404, power switch 502, and decoupler switch 414 are open as a "0" or closed as a "1". One of ordinary skill in the art will appreciate a closed gate allows for the flow of electricity, while an open gate prevents the flow of electricity. It may be observed that during $T_1$ phase RF pulse generation power switch 502 remains closed and electronic switch 404 pulses power source 402 to generate the RF pulse in NMR antenna circuit 312. While during $T_2$ phase of NMR signal acquisition power switch 502 opens and decoupler switch 414 closes, engaging second capacitor 504 and allowing first capacitor 410 to retain charge during NMR signal acquisition.

Figure 6A:
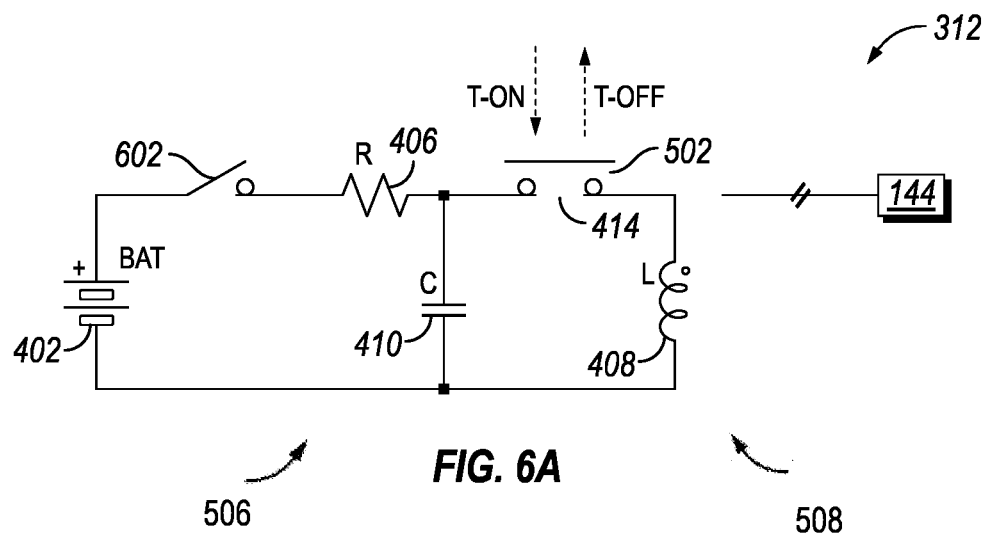
FIG. 6A illustrates another example of an improved NMR antenna circuit.

FIG. 6A represents another example of an NMR antenna circuit 312. In this example, charging switch 602 may allow for an electrical connection from power source 402 to charge first capacitor 410. At the origin of RF pulse generation, energy is delivered via charging switch 602 from power source 402 to charge first capacitor 410. However, during NMR signal acquisition or free oscillation (decay) of RF pulse, charging switch 602 is open, while power switch 502 is closed. Free oscillation is defined as when energy stored in the first capacitor 410 and inductive coil 408 is constant. As Q may depend on the conductive surroundings of the NMR antenna circuit 312, operational condition monitoring is required for power source 402 to enable proper feed forward regulation of the high voltage power supply output. Thus, high frequency switching as the one provided using the switch 404 (e.g., referring to FIG. 5A) is not needed in this example. Additionally, power switch 502 may be closed during RF pulse generation, and open during NMR signal acquisition. Thus, energy may be preserved in first capacitor 410. During NMR signal acquisition of NMR antenna circuit 312 illustrated in FIG. 6A, a second capacitor 504 (e.g., referring to FIG. 5A) may be implemented. Implementation of second capacitor 504 may rely on second capacitor 504 to resonate with inductive coil 408 as illustrated in FIG. 5A.

Alternatively, power switch 502 may remain closed during NMR signal acquisition. Thus, a second capacitor 504 may not be implemented and residual energy loss may incur at energy dump 412 (e.g., referring to FIG. 4). Additionally, power switch 502 may be removed from NMR antenna 312. Removing power switch 502 may prevent losses due to resistance of the closed power switch 502. Additionally, removing power switch 502 may allow capacitor 410 to charge before RF pulse generation.

When implementing the example presented in FIG. 6A, a free oscillation mode may be considered. During RF pulse generation, the phase of the oscillations may drift as the surroundings change during logging operations. Therefore, a system frequency adjustment may be implemented. System frequency adjustments to avoid mismatch between the transmitter frequency and reference frequency used in a quadrature detection system of receiver 416, which may be illustrated by opening and closing charging switch 602 and power switch 502 at varying times.

Figure 6B:
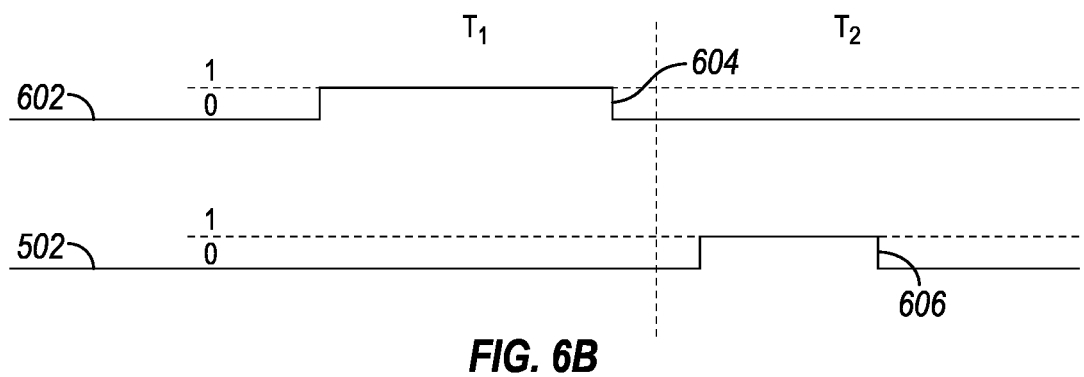
FIG. 6B illustrates a time diagram for switches from previous NMR antenna circuit.

FIG. 6B shows time diagram 604 and 606 for charging switch 602 and power switch 502. In this example, $T_1$ represents operation of NMR antenna circuit 312 while charging capacitor 410 before RF pulse generation. $T_2$ represents operation of NMR antenna circuit 312 for RF pulse generation during free oscillation. Each time diagram 604 and 606 provides whether charging switch 602 and power switch 502 are open as a "0" or closed as a "1". One of ordinary skill in the art will appreciate a closed gate allows for the flow of electricity, while an open gate prevents the flow of electricity. It may be observed that during $T_1$ phase, power switch 502 opens and charging switch 602 closes. While during $T_2$ phase, power switch 502 may close and charging switch 602 opens.

Utilizing the systems and methods above may be beneficial to improve the efficiency of generating RF pulses. Additionally, the disclosed systems and methods are improvements over current technology. For example, NMR transmit/receive circuitry is implemented having a reconfigurable antenna tank. This may be accomplished with multiple switches and two capacitors inside the NMR transmit/receive circuitry to preserve unconsumed energy in the tank created during the RF pulse generation. The switches may disconnect one capacitor from the antenna tank at the end of the RF pulse and conserve the energy for the next RF pulse. Therefore, charging the capacitor every time the RF pulse is generated and dumping the unconsumed energy may be avoided. The systems and methods may comprise any of the various features disclosed herein, including one or more of the following statements.

Statement 1. A nuclear magnetic resonance (NMR) downhole tool may comprise a housing, a power source disposed within the housing or at surface and electrically connected to the housing, a Radio Frequency (RF) pulse generator tank electrically connected to the power source and disposed in the housing, a power switch electrically disposed within the RF pulse generator tank and disposed in the housing, and an NMR signal acquisition tank electrically connected to the RF pulse generator tank and disposed in the housing.

Statement 2. The NMR antenna circuit of statement 1, further comprising an electronic switch electronically connected in series between the power source and the RF pulse generator tank.

Statement 3. The NMR antenna circuit of statement 2, further comprising a decoupler switch disposed within the NMR signal acquisition tank.

Statement 4. The NMR antenna circuit of statement 3, further comprising an information handling system, wherein the information handling system is communicatively connected to the power switch, the electronic switch, and the decoupler switch, and configured to open and close the power switch, the electronic switch, and the decoupler switch.

Statement 5. The NMR antenna circuit of statement 4, wherein the information handling system is configured to generate a RF pulse from an inductive coil electrically connected to the RF pulse antenna tank with energy stored in the first capacitor or the power source.

Statement 6. The NMR antenna circuit of statement 5, wherein the information handling system is configured to close the power switch, pulse the electronic switch, and open the decoupler switch.

Statement 7. The NMR antenna circuit of statement 4, wherein the information handling system is configured to acquire an NMR signal from an inductive coil electrically connected to the NMR signal acquisition tank.

Statement 8. The NMR antenna circuit of statement 7, wherein the information handling system is configured to open the power switch and the electronic switch and close the decoupler switch.

Statement 9. The NMR antenna circuit of statements 1 or 2, wherein the RF pulse generator tank further comprises a first capacitor and an inductive coil electrically connected to the RF pulse generator tank and the NMR signal acquisition tank.

Statement 10. The NMR antenna circuit of statement 9, wherein the first capacitor and the inductive coil are tuned to operate at a preselected frequency.

Statement 11. The NMR antenna circuit of any preceding statements 1, 2 or 9, wherein the NMR signal acquisition tank further comprises a receiver, a second capacitor, and an inductive coil electrically connected to the RF pulse generator tank and the NMR signal acquisition tank.

Statement 12. The NMR antenna circuit of statement 11, wherein the second capacitor and the inductive coil are tuned to operate at a desired frequency.

Statement 13. A method may comprise disposing a nuclear magnetic resonance (NMR) downhole tool into a wellbore. The NMR downhole tool comprise a housing, a power source disposed within the housing or at surface and electrically connected to the housing, a Radio Frequency (RF) pulse generator tank electrically connected to the power source and disposed in the housing, a power switch electrically disposed within the RF pulse generator tank and disposed in the housing, and an NMR signal acquisition tank electrically connected to the RF pulse generator tank and disposed in the housing. The method may further comprise charging a first capacitor with the power source that is electrically connected to the first capacitor, generating a Radio Frequency (RF) pulse with the RF pulse generator tank that comprise the first capacitor and an inductive coil, disconnecting the first capacitor from the RF pulse generator tank using a power switch, storing energy from the inductive coil in the first capacitor, connecting the inductive coil to an NMR signal acquisition tank using a decoupler switch, and acquiring an NMR signal with the NMR signal acquisition tank.

Statement 14. The method of statement 13, further comprising energizing the inductive coil with energy stored in the first capacitor and the power source.

Statement 15. The method of statement 14, further comprising pulsing an electronic switch disposed between the power source and the RF pulse generator tank to energize the inductive coil.

Statement 16. The method of any preceding statements 13 or 14, further comprising opening a charging switch disposed within the RF pulse generator tank to disconnect the first capacitor from the RF pulse generator tank.

Statement 17. The method of any preceding statements 13, 14, or 16, further comprising closing a decoupler switch disposed within the NMR signal acquisition tank to connect the NMR signal acquisition tank to the inductive coil.

Statement 18. The method of any preceding statements 13, 14, 16, or 17, wherein the RF pulse generator tank further comprises a first capacitor.

Statement 19. The method of any preceding statements 13, 14, or 16-18, wherein the first capacitor and the inductive coil are tuned to operate at a desired frequency.

Statement 20. The method of any preceding statements 13, 14, or 16-19, wherein the NMR signal acquisition tank further comprises a receiver and a second capacitor, wherein the second capacitor and the inductive coil are tuned to operate at a desired frequency.

Accordingly, the systems and methods of the present disclosure allow for the efficient transmission of signals from a nuclear magnetic resonance logging tool in a downhole environment. The systems and methods may comprise any of the various features disclosed herein, including one or more of the following statements.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A nuclear magnetic resonance (NMR) downhole tool comprising:
    a housing;
    a power source disposed within the housing or at surface and electrically connected to the housing;
    a Radio Frequency (RF) pulse generator tank electrically connected to the power source and disposed in the housing;
    a power switch electrically disposed within the RF pulse generator tank and disposed in the housing;
    an NMR signal acquisition tank electrically connected to the RF pulse generator tank and disposed in the housing;
    an electronic switch electronically connected in series between the power source and the RF pulse generator tank;
    a decoupler switch disposed within the NMR signal acquisition tank; and
    an information handling system, wherein the information handling system is communicatively connected to the power switch, the electronic switch, and the decoupler switch, and configured to open and close the power switch, the electronic switch and the decoupler switch, wherein the information handling system is configured to generate a RF pulse from an inductive coil electrically connected to the RF pulse generator tank with energy stored in a first capacitor or the power source, wherein the information handling system is configured to close the power switch and pulse the electronic switch and then open the decoupler switch.

2. The NMR antenna circuit of claim 1, wherein the information handling system is configured to acquire an NMR signal from an inductive coil electrically connected to the NMR signal acquisition tank.

3. The NMR antenna circuit of claim 2, wherein the information handling system is configured to open the power switch and the electronic switch and close the decoupler switch.

4. The NMR antenna circuit of claim 1, wherein the RF pulse generator tank further comprises a first capacitor and an inductive coil electrically connected to the RF pulse generator tank and the NMR signal acquisition tank.

5. The NMR antenna circuit of claim 4, wherein the first capacitor and the inductive coil are tuned to operate at a preselected frequency.

6. The NMR antenna circuit of claim 1, wherein the NMR signal acquisition tank further comprises a receiver, a second capacitor, and an inductive coil electrically connected to the RF pulse generator tank and the NMR signal acquisition tank.

7. The NMR antenna circuit of claim 6, wherein the second capacitor and the inductive coil are tuned to operate at a desired frequency.

8. A method comprising:
    disposing a nuclear magnetic resonance (NMR) downhole tool into a wellbore, wherein the NMR downhole tool comprises:
        a housing;
        a power source disposed within the housing or at surface and electrically connected to the housing;
        a Radio Frequency (RF) pulse generator tank electrically connected to the power source and disposed in the housing;
        a power switch electrically disposed within the RF pulse generator tank and disposed in the housing; and
        an NMR signal acquisition tank electrically connected to the RF pulse generator tank and disposed in the housing;
        an electronic switch electronically connected in series between the power source and the RF pulse generator tank; and
    charging a first capacitor with the power source that is electrically connected to the first capacitor;
    generating a Radio Frequency (RF) pulse with the RF pulse generator tank that comprise the first capacitor and an inductive coil;
    disconnecting the first capacitor from the RF pulse generator tank using a power switch;
    storing energy from the inductive coil in the first capacitor;
    connecting the inductive coil to an NMR signal acquisition tank using a decoupler switch; and
    acquiring an NMR signal with the NMR signal acquisition tank, wherein acquiring the NMR signal comprises opening the power switch and the electronic switch and then closing the decoupler switch.

9. The method of claim 8, further comprising energizing the inductive coil with energy stored in the first capacitor and the power source.

10. The method of claim 9, further comprising pulsing an electronic switch disposed between the power source and the RF pulse generator tank to energize the inductive coil.

11. The method of claim 8, further comprising opening a charging switch disposed within the RF pulse generator tank to disconnect the first capacitor from the RF pulse generator tank.

12. The method of claim 8, further comprising closing a decoupler switch disposed within the NMR signal acquisition tank to connect the NMR signal acquisition tank to the inductive coil.

13. The method of claim 8, wherein the RF pulse generator tank further comprises a first capacitor.

14. The method of claim 8, wherein the first capacitor and the inductive coil are tuned to operate at a desired frequency.

15. The method of claim 8, wherein the NMR signal acquisition tank further comprises a receiver and a second capacitor, wherein the second capacitor and the inductive coil are tuned to operate at a desired frequency.

* * * * *